US009946452B1

(12) United States Patent
Jitkoff et al.

(10) Patent No.: US 9,946,452 B1
(45) Date of Patent: Apr. 17, 2018

(54) MOVABLE INFORMATION PANELS

(71) Applicant: GOOGLE INC., Mountain View, CA (US)

(72) Inventors: John Nicholas Jitkoff, Palo Alto, CA (US); Glen Murphy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/467,791

(22) Filed: Aug. 25, 2014

Related U.S. Application Data

(60) Division of application No. 12/904,151, filed on Oct. 13, 2010, now Pat. No. 9,529,517, which is a continuation-in-part of application No. 12/774,520, filed on May 5, 2010, now Pat. No. 9,063,645.

(60) Provisional application No. 61/360,319, filed on Jun. 30, 2010, provisional application No. 61/251,189, filed on Oct. 13, 2009.

(51) Int. Cl.
| | |
|---|---|
| *G06F 3/0486* | (2013.01) |
| *G06F 3/0484* | (2013.01) |
| *G06F 17/21* | (2006.01) |
| *G06F 17/30* | (2006.01) |

(52) U.S. Cl.
CPC ........ *G06F 3/0486* (2013.01); *G06F 3/04842* (2013.01); *G06F 17/212* (2013.01); *G06F 17/30873* (2013.01)

(58) Field of Classification Search
CPC .......... G06F 3/0486; G06F 3/048; G06F 8/34; G06F 17/30861; G06F 17/30896

USPC ......................................... 715/769, 760, 788
See application file for complete search history.

(56) References Cited

U.S. PATENT DOCUMENTS

| | | | |
|---|---|---|---|
| 5,821,931 A | 10/1998 | Berquist et al. | |
| 5,870,091 A | 2/1999 | Lazarony et al. | |
| 6,215,490 B1 | 4/2001 | Kaply | |
| 6,380,957 B1 | 4/2002 | Banning | |
| 7,089,278 B1 * | 8/2006 | Churchill | G06Q 10/10 |
| | | | 709/203 |
| 7,117,433 B1 * | 10/2006 | Glaser | G06F 17/243 |
| | | | 707/E17.116 |
| 7,124,373 B1 | 10/2006 | Patil | |
| 7,275,063 B2 | 9/2007 | Horn | |
| 7,426,697 B2 | 9/2008 | Holecek et al. | |

(Continued)

FOREIGN PATENT DOCUMENTS

| | | |
|---|---|---|
| EP | 1526463 A1 | 4/2005 |
| EP | 2428919 A1 | 3/2012 |

(Continued)

OTHER PUBLICATIONS

Final Office Action for U.S. Appl. No. 12/904,151, dated Aug. 28, 2015, 18 pages.

(Continued)

*Primary Examiner* — Rinna Yi
(74) *Attorney, Agent, or Firm* — Brake Hughes Bellermann LLP

(57) ABSTRACT

Various techniques, methods and apparatus are disclosed. In some example embodiments, a movable information panel may be moved to be displayed as a tabbed web page, moved to a different application window, or docked to a horizontal or vertical panel bar. Other example embodiments are also disclosed.

14 Claims, 13 Drawing Sheets

(56) References Cited

U.S. PATENT DOCUMENTS

| | | | |
|---|---|---|---|
| 8,769,428 | B2 | 7/2014 | Mir et al. |
| 8,850,354 | B1 | 9/2014 | Titov et al. |
| 9,063,645 | B1 | 6/2015 | Jitkoff et al. |
| 2002/0130904 | A1* | 9/2002 | Becker .................. G06F 3/0481 715/753 |
| 2003/0088623 | A1 | 5/2003 | Kusuda |
| 2003/0160815 | A1 | 8/2003 | Muschetto |
| 2004/0006743 | A1 | 1/2004 | Oikawa et al. |
| 2004/0095397 | A1 | 5/2004 | Nojima et al. |
| 2004/0100501 | A1* | 5/2004 | Dornback ............. G06F 3/0486 715/769 |
| 2004/0210847 | A1 | 10/2004 | Berson et al. |
| 2004/0268232 | A1 | 12/2004 | Tunning |
| 2005/0004990 | A1 | 1/2005 | Durazo et al. |
| 2005/0235293 | A1 | 10/2005 | Fortes et al. |
| 2006/0036969 | A1* | 2/2006 | Guido ............... G06F 17/30873 715/804 |
| 2006/0059441 | A1 | 3/2006 | Todd |
| 2006/0161859 | A1 | 7/2006 | Holecek et al. |
| 2006/0200751 | A1 | 9/2006 | Underwood et al. |
| 2007/0162865 | A1 | 7/2007 | Haynes et al. |
| 2008/0065982 | A1 | 3/2008 | Evanchik et al. |
| 2008/0134093 | A1 | 6/2008 | Dharmarajan et al. |
| 2008/0184157 | A1 | 7/2008 | Selig |
| 2009/0013244 | A1* | 1/2009 | Cudich ................. G06F 17/241 715/234 |
| 2009/0125833 | A1* | 5/2009 | Abernethy, Jr. ...... G06F 9/4443 715/779 |
| 2010/0269062 | A1 | 10/2010 | Kobylinski |
| 2010/0313156 | A1 | 12/2010 | Louch et al. |
| 2011/0010641 | A1 | 1/2011 | Wolff et al. |
| 2011/0022955 | A1 | 1/2011 | Gilfix |
| 2011/0087984 | A1 | 4/2011 | Jitkoff et al. |
| 2013/0268837 | A1 | 10/2013 | Braithwaite et al. |
| 2015/0199123 | A1 | 7/2015 | Jitkoff et al. |

FOREIGN PATENT DOCUMENTS

| | | |
|---|---|---|
| WO | 2000/56055 A2 | 9/2000 |
| WO | 2013/154904 A1 | 10/2013 |

OTHER PUBLICATIONS

Non-Final Office Action for U.S. Appl. No. 12/774,520, dated Apr. 27, 2012, 11 pages.

Response to Non-Final Office Action for U.S. Appl. No. 12/774,520, dated Jul. 27, 2012, 14 pages.

Final Office Action for U.S. Appl. No. 12/774,520, dated Sep. 11, 2012, 13 pages.

Response to Final Office Action for U.S. Appl. No. 12/774,520, dated Jan. 10, 2013, 22 pages.

Non-Final Office Action for U.S. Appl. No. 12/774,520, dated Mar. 11, 2014, 21 pages.

Response to Non-Final Office Action for U.S. Appl. No. 12/774,520, dated Jul. 1, 2014, 12 pages.

Non-Final Office Action for U.S. Appl. No. 12/904,151, dated Nov. 5, 2012, 14 pages.

Response to Non-Final Office Action for U.S. Appl. No. 12/904,151, dated Feb. 5, 2013, 14 pages.

Final Office Action for U.S. Appl. No. 12/904,151, dated Mar. 20, 2013, 11 pages.

Response to Final Office Action for U.S. Patent Appl. No. 12/904,151, dated Jun. 14, 2013, 18 pages.

Non-Final Office Action for U.S. Appl. No. 12/904,151, dated Dec. 10, 2013, 13 pages.

Response to Non-Final Office Action for U.S. Appl. No. 12/904,151, dated Apr. 10, 2014, 14 pages.

Final Office Action for U.S. Appl. No. 12/904,151, dated Jun. 18, 2014, 17 pages.

International Search Report and Written Opinion received for PCT Patent Application No. PCT/US2013/035252, dated Jul. 26, 2013, 16 pages.

cybernet.com, "Helpful Tip: Drag & Drop Text/URL's in Firefox", available online at <http://cybernetnews.com/helpful-tip-drag-drop-texturls-in-firefox/>, retrieved on Oct. 26, 2012, 7 Pages.

Mathews, Lee, "Chrome OS 'panels' and Google Talk Chrome Web app go cross-platform", available online at <http://downloadsquad.switched.com/2011/02/26/chrome-os-panels-and-google-talk-app-go-cross-platform/>, Feb. 26, 2011, 6 pages.

chromium.org, "Panels—The Chromium Projects", available online at <http://www.chromium.org/developers/design-documents/extensions/proposed-changes/apis-under-development/panels>, retrieved on Apr. 10, 2012, 2 pages.

microsoft.com, "How to move the Windows Taskbar from its default position or reset it to its default position", available online at <http://support.microsoft.com/kb/253679>, retrieved on Apr. 10, 2012, 2 pages.

Response to Final Office Action for U.S. Appl. No. 12/904,151, dated Aug. 14, 2014, 13 pages.

International Preliminary Report on Patentability for PCT Patent Application No. PCT/US2013/035252, dated Oct. 23, 2014, 8 pages.

U.S. Final Office Action received for U.S. Appl. No. 13/443,103, dated Jan. 29, 2016, 13 Pages.

* cited by examiner

MOVABLE INFORMATION PANELS

CROSS REFERENCE TO RELATED APPLICATIONS

This application is a divisional of, and claims priority to, U.S. application Ser. No. 12/904,151, filed on Oct. 13, 2010, entitled "Movable Information Panels", which, in turn, is a continuation-in-part application of U.S. application Ser. No. 12/774,520, filed on May 5, 2010, entitled "Expandable and Collapsible Information Panels," the disclosures each of which are hereby incorporated by reference in their entirety.

This application also claims the benefit of U.S. Provisional Application No. 61/360,319, filed Jun. 30, 2010, entitled "Movable Information Panels," and U.S. Provisional Application No. 61/251,289, filed Oct. 13, 2009, entitled "A Browser Based Cloud Optimized Computer Platform," the disclosures each of which are hereby incorporated by reference in their entirety.

TECHNICAL FIELD

This document relates to methods and apparatus for displaying and manipulating information in a web browser.

BACKGROUND

With the creation of the world-wide-web and high speed computer networks, the paradigm for personal computer usage has dramatically shifted. In the past, users would primarily use their personal computers to run programs, and store and manipulate data that was located on their local hard-drive. Only rarely would users store or manipulate data located on a networked drive, or run a program that was provided as a network service, and even then, the programs and data were usually restricted to a local area network. Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program.

Due to this shift in computer usage, today's computer users are unlikely to want or need many of the bells and whistles provided by modern operating systems. They do not need to worry about file structures or organizing or backing up their data, because much of their data is stored, organized and backed up for them on the cloud. They do not need to worry about loading and updating software, because most of the software they use is provided to them when needed as a cloud-based service. Instead, today's computer users are more interested in quickly logging onto their computer, launching a web browser, and accessing data and programs of interest to them, which are accessible through the world wide web.

SUMMARY

This document describes systems and techniques to manage and display information in a user interface.

According to an example embodiment, a computer implemented method may include displaying, by a processor, an information panel that is associated with a first tabbed web page of a browser window; moving, by the processor via a drag-and-drop operation, a location of the information panel to a tab strip where one or more tabs are located; and, displaying the information panel as a second tabbed web page of the browser based on the moving.

According to another example embodiment, a computer program product is provided that is tangibly embodied on a computer-readable storage medium having executable-instructions stored thereon, the instructions being executable to cause a second computer to: display, by a processor, an information panel that is associated with a first tabbed web page of a browser window; move, by the processor via a drag-and-drop operation, a location of the information panel to a tab strip where one or more tabs are located; and display the information panel as a second tabbed web page of the browser based on the moving.

According to another example embodiment, an apparatus may include: at least one processor; and at least one memory including computer program code, the at least one memory and the computer program code configured to, with the at least one processor cause the server to: display, by a processor, an information panel that is associated with a first tabbed web page of a browser window; move, by the processor via a drag-and-drop operation, a location of the information panel to a tab strip where one or more tabs are located; and display the information panel as a second tabbed web page of the browser based on the moving.

According to another example embodiment, a computer implemented method may include displaying, by a processor, a movable information panel that is provided at a first location within a boundary of a first application window; moving, by the processor via a drag-and-drop operation, the information panel to a second location within a boundary of a second application window; and associating the information panel to the second application window.

According to another example embodiment, a computer program product is provided that is tangibly embodied on a computer-readable storage medium having executable-instructions stored thereon, the instructions being executable to cause a second computer to: display, by a processor, a movable information panel that is provided at a first location within a boundary of a first application window; move, by the processor via a drag-and-drop operation, the information panel to a second location within a boundary of a second application window; and associate the information panel to the second application window.

According to another example embodiment, an apparatus may include: at least one processor; and at least one memory including computer program code, the at least one memory and the computer program code configured to, with the at least one processor cause the server to: display, by a processor, a movable information panel that is provided at a first location within a boundary of a first application window; move, by the processor via a drag-and-drop operation, the information panel to a second location within a boundary of a second application window; and associate the information panel to the second application window.

According to yet another example embodiment, a computer implemented method may include displaying, by a processor, an information panel that is associated to a first web page of a browser window; moving, by the processor via a drag-and-drop operation, the information panel outside the first tabbed web page to a panel bar on a desktop user interface; and docking the information panel to the panel bar based on the moving.

According to another example embodiment, a computer program product is provided that is tangibly embodied on a computer-readable storage medium having executable-instructions stored thereon, the instructions being executable to cause a second computer to: display, by a processor, an information panel that is coupled associated to a first web page of a browser window; move, by the processor via a drag-and-drop operation, the information panel outside the first tabbed web page to a panel bar on a desktop user interface; and docking the information panel to the panel bar based on the moving.

According to another example embodiment, an apparatus may include: at least one processor; and at least one memory including computer program code, the at least one memory and the computer program code configured to, with the at least one processor cause a second computer to: display, by a processor, an information panel that is coupled associated to a first web page of a browser window; move, by the processor via a drag-and-drop operation, the information panel outside the first tabbed web page to a panel bar on a desktop user interface; and docking the information panel to the panel bar based on the moving.

DESCRIPTION OF DRAWINGS

Like reference symbols in the various drawings indicate like elements.

DETAILED DESCRIPTION

In many web based applications, for example, in a web-based e-mail application, the left hand side of the display may contain a number of Graphical User Interface ("GUI") objects, hereafter referred to as information panels, which organize information such as emails or contact lists that are displayed to a user. For example, in a web-based email application, "Inbox," "Draft," "Sent," or "Spam" information panels can be provided to organize a user's emails. To facilitate navigation of the information contained within these information panels, the panels can be made expandable and collapsible. For example, when a user is looking for a particular email he or she has sent, the "Sent" folder can be expanded and the remaining folders collapsed (e.g., by clicking on the panels). These information panels, however, can also be automatically expanded or collapsed based on the user's actions within the web browser or user interface.

Figure 1A:
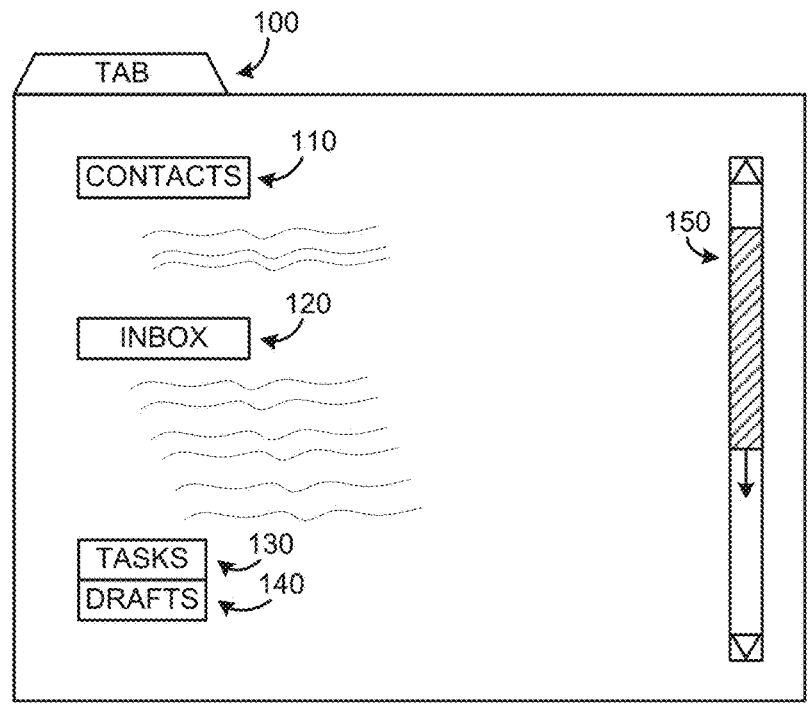
FIGS. 1A and 1B are a schematic illustration of a web-browser that provides a user with automatically collapsible and expandable information panels in a web based application.
Figure 1B:
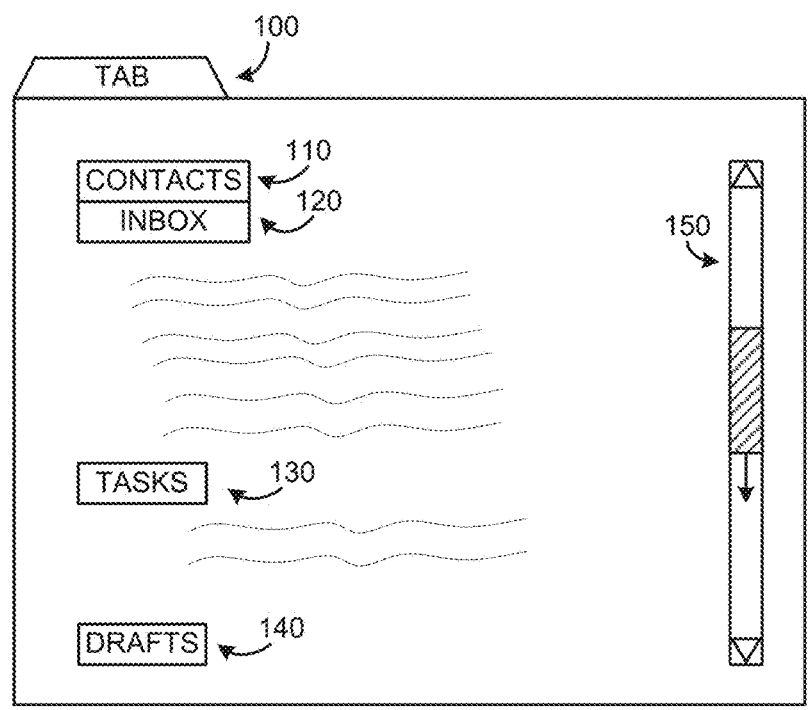

FIGS. 1A and 1B are a schematic illustration of an application, such as a web-browser that provides a user with automatically collapsible and expandable information panels in a web based application. An information panel may be a set of displayable information, which may be docked parallel to an edge of a window, or selected and moved to different locations. The use of a web browser herein is used as an illustrative example of applications that may be used in the various embodiments. However, other applications may be used as well. As shown in FIG. 1A, an email application (which may, for example be a web-based email application) can provide a number of expandable and collapsible information panels 110-140 as well as a scroll bar 150 in a tabbed browser window 100. Under each information panel, one or more items of information can be stored. For example, under the "Contacts" panel 110, a plurality of contact documents such as vCards (i.e., electronic business cards) can be stored, while under the "Inbox" panel 120, a plurality of email messages that have been sent to the user can be stored. To facilitate the user's visibility into and access to the information that is stored in the application, one or more of the information panels can be expanded by default. For example, all of the information panels whose contents are fully or partially displayable within the window 100 can be expanded by default. When an information panel is expanded or displayed in its expanded state, one or more information elements that are within the information panel are displayed beneath the information panel. Thus, as shown in FIG. 1A, information panels 110 and 120 can be expanded since at least one item under each panel is displayable within the window 100, while information panels 130 and 140 can be collapsed since none of the items under either panel are currently displayable within the window 100. When an information panel is collapsed or displayed in its collapsed state, none of the information elements that are within the information panel are displayed beneath the information panel.

In one implementation, in order to view the information contained within a collapsed information panel, such as the "Tasks" panel 130, the user can manually collapse one or more of the currently expanded information panels 110 and 120, and manually expand the "Tasks" information panel 130. The user can do this, for example, by clicking on the "Tasks" information panel 130 to manually toggle its display state from a collapsed to an expanded state, and by clicking on the "Inbox" information panel 120 to manually toggle its display state from an expanded to a collapsed state. Alternatively, as disclosed herein, when a user manually expands an information panel, the operating system and/or application (e.g., browser) can automatically collapse other information panels that are displayed in their expanded state. For example, when the user clicks on the "Tasks" information panel 130 to manually expand it, the operating system and/or browser can automatically collapse the "Contacts" and "Inbox" information panels 110 and 120 to maximize the screen area in the window 100 that can be used to display the information elements under the "Tasks" information panel 130. Moreover, as the user scrolls down the window 100, the operating system and/or browser can receive information about the user's movement within the user interface and/or browser window 100 and can use that information to automatically expand and collapse one or more of the information panels 110-140.

As shown in FIG. 1B, as a user scrolls through the items in an expanded "Contacts" information panel 110, the operating system and or web browser can move the items under the "Contacts" information panel 110 upward, and can eventually move them off-screen. When the user has scrolled through all of the items under the "Contacts" information panel 110, the operating system and/or browser can automatically collapse the information panel but continue to display its title. When the operating system and/or browser automatically collapses the "Contacts" information panel 110 as described above, it can display the "Inbox" information panel 120 directly beneath the "Contacts" information panel 110. As the user scrolls through the information elements under the expanded "Inbox" information panel 120, the operating system and/or browser can similarly move the information elements in the "Inbox" information panel 120 upward and eventually off-screen. As with the information elements under the "Contacts" information panel 110, when the user has scrolled through all of the information elements under the "Inbox" information panel 120, the operating system and/or browser can automatically collapse the "Inbox" information panel 120 but continue to display its title.

In addition to automatically collapsing information panels based on the user's actions within the user interface, the operating system and/or browser can automatically expand information panels. For example, as the user scrolls down through the "Contact" 110 and "Inbox" 120 information panels, the operating system and/or browser can use information regarding the position of the scroll bar within the window 100 to determine whether any information elements under the "Tasks" information panel 130 have become displayable. When at least one such information element becomes displayable, the operating system and/or browser can automatically expand the "Tasks" information panel 130 to display that information element beneath the title of the "Tasks" information panel. In one implementation, when determining which information elements under an information panel are currently displayable within the window 100, the operating system and/or browser can reserve screen space to display the titles of the other information panels. For example, when determining which information elements under the "Tasks" information panel 130 are currently displayable, the operating system and/or browser can reserve screen space to display at least the titles of the "Contacts" 110, "Inbox" 120, and "Drafts" 140 information panels.

The operating system and/or browser can also automatically expand the "Tasks" information panel 130 whenever the user has scrolled past the title of that information panel. For example, when the operating system and/or browser determines that the user has scrolled past the title of the "Tasks" information panel 130, the operating system and/or browser can automatically expand the "Tasks" information panel 130 to reveal one or more information elements under the information panel. In one implementation, the operating system and/or browser can automatically expand the "Tasks" information panel 130 to reveal as many information elements under the "Tasks" information panel 130 as possible, beginning with the first information element.

The process described above, i.e., of automatically expanding and contracting an application's information panels to facilitate a user's view of information stored in an application, is not limited to application based information panels such as the web-based email application's information panels described above. Instead, the process can be used to automatically expand and contract other types of information panels that can be displayed within any user interface such as a desktop display. An information panel may be moved to different locations and may be docked to an edge of the desktop display, e.g., to a panel bar. Information panels may also be displayed or positioned in any other suitable way, e.g., aligned in parallel with but not directly against an edge of a desktop display. Desktop user interface information panels can contain applications, notifications, browser histories, document lists, music play lists, chat histories and user generated content such as pop-up windows. For example, a Talk application (which may be a chat application), can be docked as an information panel in a desktop user interface on a computer display. When expanded, the "Talk" information panel can reveal a list of chats the user has had with other users using the "Talk" application, as well as metadata about the chats (e.g., with whom they were conducted), and the content of the chats themselves. Similarly, the "Docs" application (which may be a word processing application) can be docked as an information panel to the side of a desktop user interface on a computer display. When expanded, the "Docs" information panel can reveal a list of documents the user has created, reviewed or edited using the "Docs" application or any other document creation and viewing application. The documents in the list can be stored locally on the user's computer, or remotely on a network or cloud-based server.

In general, the operating system and/or browser can automatically expand and collapse desktop user interface information panels based on a user's activity within or movement through the desktop user interface. For example, as explained above, the operating system and/or browser can determine whether to automatically expand or collapse an information panel based on the position and movement of a scroll bar within the user interface or based on the position and movement of a cursor representing a pointing device (e.g., a mouse) within the user interface. The operating system and/or browser can receive information about the current position of a scroll bar or cursor within the user interface, and can automatically expand one or more information panels to reveal the information elements that are contained within those information panels as described above. For example, if a user selects (e.g., clicks on) an information panel with a pointing device, the operating system and/or application (e.g., browser) can expand that information panel to reveal its information elements to the user. In doing so, the operating system and/or browser can automatically collapse other information panels to reveal more content from the information panel selected by the user. Similarly, as a user scrolls through the desktop user interface, the operating system and/or browser can determine from the position of the scroll bar when at least one information element within an information panel becomes displayable, and can automatically expand the information panel when such a determination is made.

The operating system and/or application (e.g., browser) can also automatically collapse one or more information panels based on the position and movement of a scroll bar or cursor representing a pointing device within the user interface. For example, the operating system and/or browser can automatically collapse all information panels except for an information panel the user selects (e.g., clicks on) with a pointing device. The operating system and/or browser can also determine, based on the position of a scroll bar within the user interface, when none of the information elements within an information panel are currently displayable within the user interface, and can automatically collapse the information panel when such a determination is made. Similarly, as described above, the operating system and/or browser can automatically collapse an information panel when a user has scrolled through all of the information elements that are contained within that information panel.

Figure 2A:
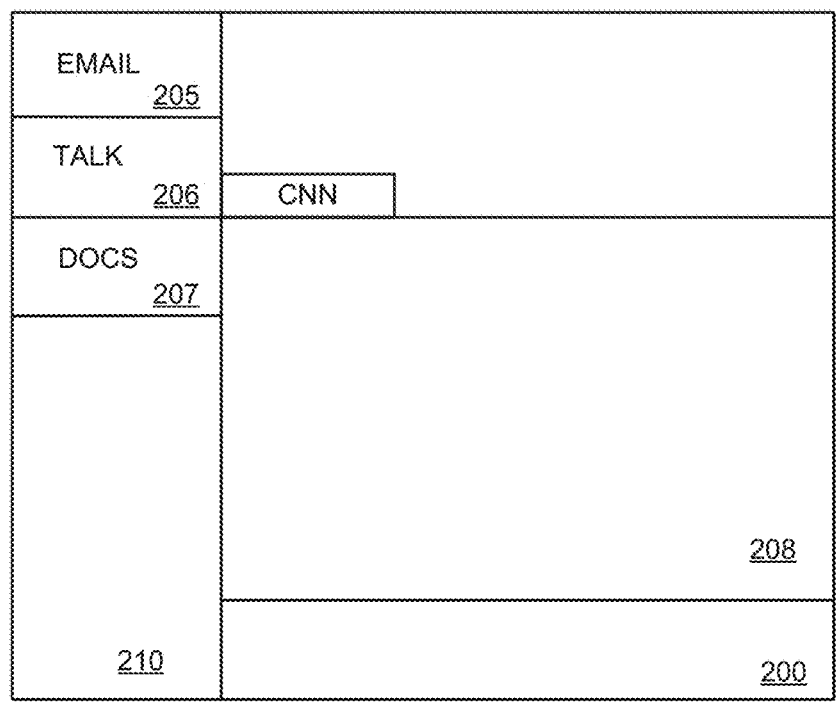
FIGS. 2A and 2B are a schematic illustration of a computer user interface that contains a plurality of expandable and collapsible information panels vertically stacked in a panel bar.
Figure 2B:
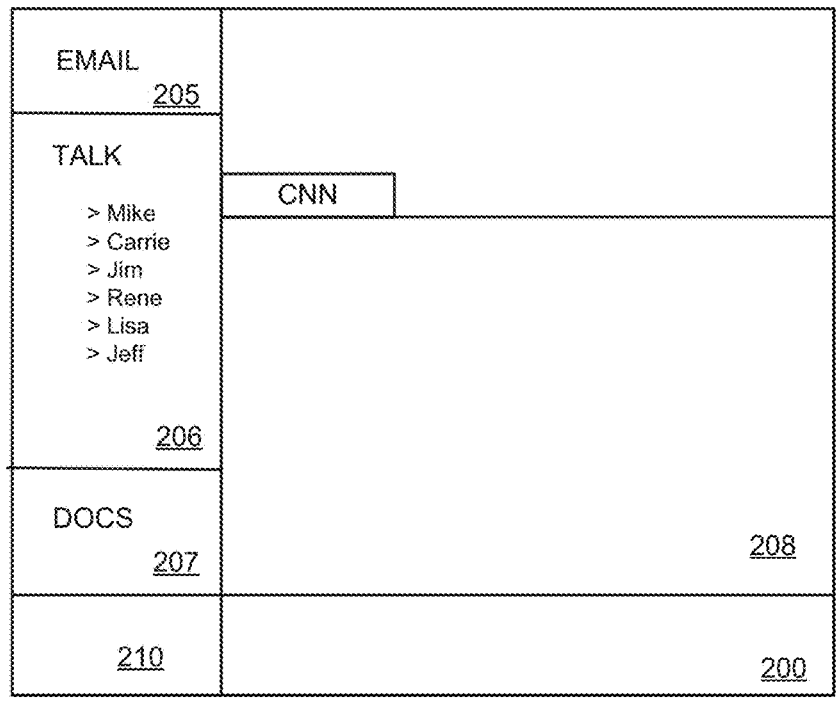

FIGS. 2A and 2B are a schematic illustration of a desktop user interface that contains a plurality of expandable and collapsible information panels vertically stacked in a panel bar. In an example operating system (OS), each tab in a tabbed web browser can be treated as a separate windowing element and can have all the attributes, priorities and privileges of the web browser itself. Consequently, tabs in the web browser can be separated from the browser and docked to an edge of the desktop user interface as an information panel in a panel bar. The information panels can be vertically stacked along a side of the screen in a vertical panel bar, or horizontally displayed at the top or bottom of the screen in a horizontal panel bar.

As shown in FIG. 2A, Email 205 (which may be an email application), Talk 206 and Docs 207 applications can be vertically stacked as a series of information panels in a vertical Panel Bar 210 of a desktop user interface 200. Vertical Panel Bar 210 can be displayed at the left edge of user interface 200 as shown in the figures, or along the right edge of user interface 200 (not shown). As with the information panels in an application user interface, the information panels in a desktop user interface can be automatically expanded and collapsed by an operating system based on a user's activity within the user interface. The automatic expansion and collapse of information panels within a desktop user interface can occur in the same manner as the automatic expansion and collapse of information panels within an application user interface (e.g., the "Inbox", "Contacts", "Tasks" and "Drafts" information panels in the web-based email application) as described above. As the user interacts with objects on the desktop (e.g., drags a pointing device across the objects on the desktop), the operating system can use information about the current position and movement of the cursor or pointing device, for example, to automatically expand an information panel in the Panel Bar 210. For example, the operating system can expand an information panel when a user selects it (e.g., clicks on it), and can automatically collapse other information panels within the desktop user interface in order to provide the user with a deeper view into the selected information panel. Moreover, the operating system can expand an information panel when the user scrolls past the title of the information panel, or when the operating system and/or browser determines that at least one information element within the information panel becomes displayable within the user interface. Similarly, the operating system can automatically collapse an information panel in the Panel Bar 210 when the user has scrolled past the last information element in the information panel, or when the operating system and/or browser determines that none of the information elements within the information panel are currently displayable.

As shown in FIG. 2B, when the operating system automatically expands an information panel, such as the "Talk" information panel 206, the individual information elements that are contained within that information panel are revealed. For example, when a user scrolls past the "Talk" information panel 206, the operating system can automatically expand the "Talk" information panel 206 to reveal a number of recent chats the user has had with other users. The information revealed can include, for example, the person with whom the user chatted and the date and time (not shown) of the chat. Other information could also be revealed, such as the duration of the chat and the content of the chat itself. When different information panels are expanded, different information elements can be revealed. For example, if the operating system and/or browser automatically expanded the "Docs" information panel 207, the expanded information panel could reveal a list of documents the user has recently opened, saved, created, edited, copied, renamed or viewed. And, as discussed above, were the user to scroll up and through all of the information elements in the "Talk" information panel 206, the operating system could automatically collapse the "Talk" information panel 206 and expand the "Email" information panel 205. Once expanded, the "Email" information panel 205 could reveal a list of email messages the user has recently sent or received.

Figure 2C:
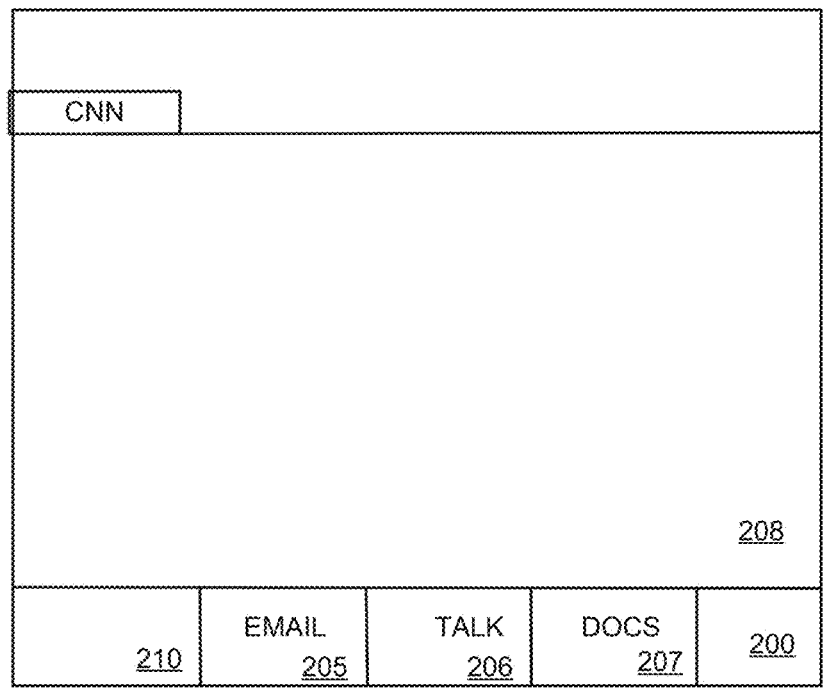
FIGS. 2C and 2D are a schematic illustration of a computer user interface that contains a plurality of expandable and collapsible information panels horizontally displayed in a panel bar.
Figure 2D:
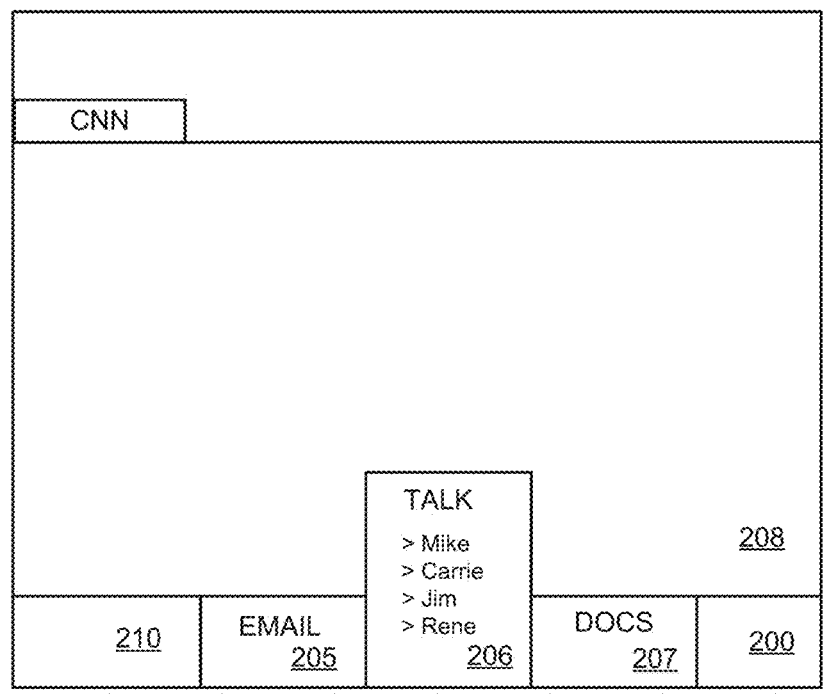

In another implementation, as shown in FIGS. 2C and 2D, the Email 205, Talk 206 and Docs 207 applications can be horizontally displayed as a series of information panels in a horizontal panel bar 210 of desktop user interface 200. The horizontal panel bar 210 can be displayed at the bottom edge of user interface 200 as shown in the figures, or along the top edge of user interface 200 (not shown). The Email 205, Talk 206 and Docs 207 information panels can be automatically expanded and collapsed when displayed in horizontal panel bar 210 in the same manner as described above when they are displayed in a vertical panel bar 210. As the user moves through the user interface, the operating system can use information about the current position and movement of a horizontal scroll bar or cursor representing a pointing device to automatically expand and collapse the horizontally displayed Email 205, Talk 206 and Docs 207 information panels in the horizontal panel bar 210. For example, the operating system can expand an information panel when a user selects it or when the user scrolls past its title. Similarly, the operating system can automatically collapse an expanded information panel in the horizontal panel bar 210 when the user has scrolled past the title of the information panel.

As shown in FIG. 2D, when the operating system automatically expands an information panel, such as the "Talk" information panel 206, the individual information elements that are contained within that information panel are revealed. For example, when a user scrolls past the "Talk" information panel 206, the operating system can automatically expand the "Talk" information panel 206 to reveal a number of recent chats the user has had with other users. When different information panels are expanded, different information elements can be revealed. And, were the user to scroll past the "Talk" information panel 206, the operating system could automatically collapse the "Talk" information panel 206 and automatically expand the "DOCS" information panel 207. Once expanded, the "DOCS" information panel 207 could reveal a list of documents the user has recently opened, saved, created, edited, copied, renamed or viewed.

Figure 3:
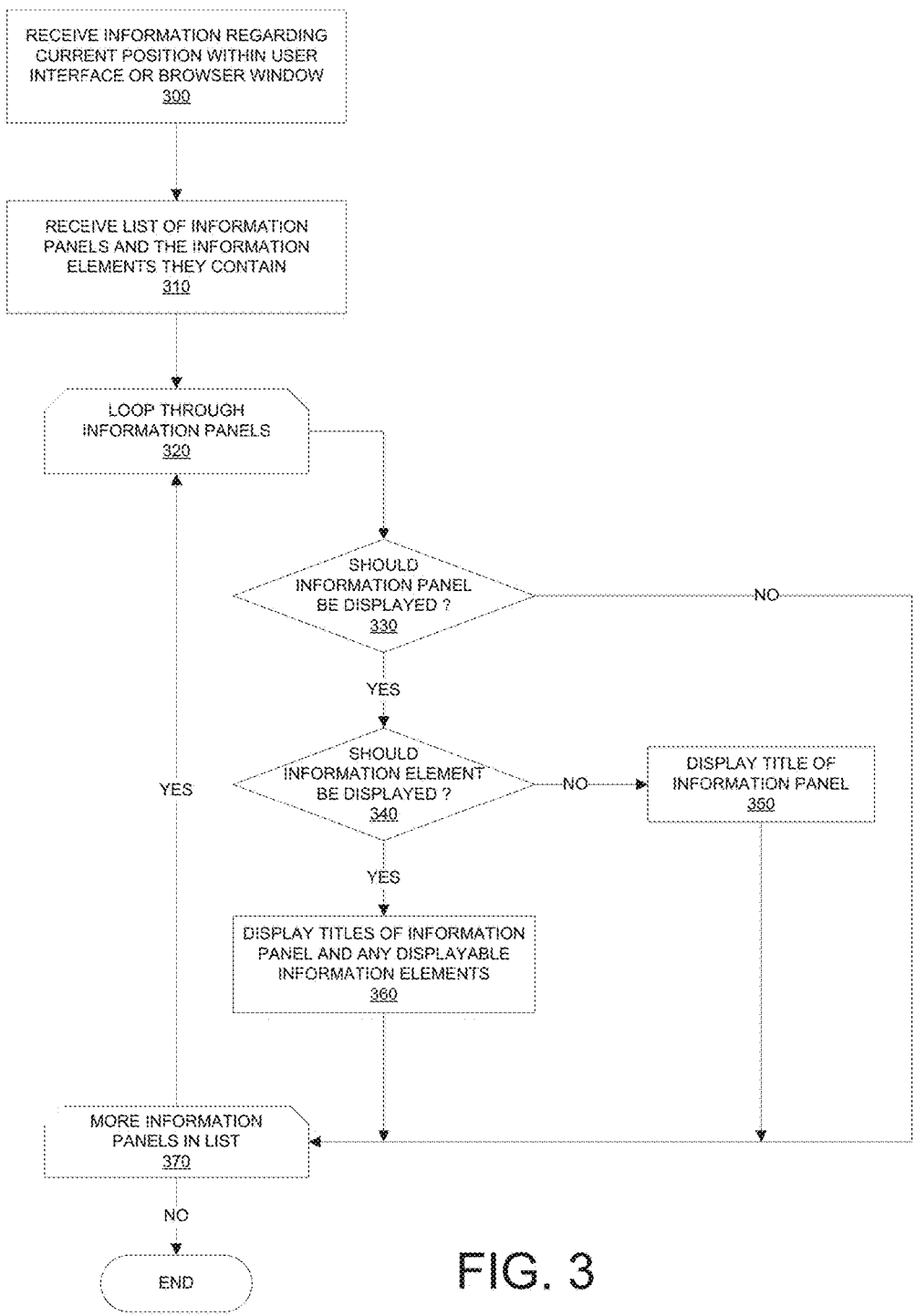
FIG. 3 is a flow chart disclosing a method for automatically expanding, collapsing and displaying information panels and information elements in a user interface.

FIG. 3 is a flow chart disclosing a method for automatically expanding, contracting and displaying information panels and the information elements they contain in a user interface. As shown in FIG. 3, an operating system and/or application (e.g., browser) can receive information regarding a user's current position within a user interface (300). The user interface can be displayed on a computer display or within a browser window displayed on the computer display. The user's current position within the user interface can be determined, e.g., from the position of a cursor representing a pointing device (e.g., a mouse, trackball or touch screen element), from the current position of a scroll bar within the user interface, from the position of a text cursor, or from any other suitable data. The operating system and/or browser can also receive a list of information panels to be displayed in the user interface, and the information elements contained within those information panels (310). The information panels can be docked in a Panel Bar 210 of a desktop user interface on a computer 200 as shown in FIG. 2, or can displayed within a browser window 100 as shown in FIG. 1. The Panel Bar 210 can be displayed along a vertical edge (e.g., left or right) of the user interface as shown in FIG. 2, or can be displayed along a horizontal edge (e.g., top or bottom) of the user interface.

The operating system and/or browser can loop through the received information panels (320), and can determine for each information panel whether the information panel is currently displayable and/or should currently be displayed within the user interface (330). To make this determination, the operating system can use information about the current size of the user interface or browser window and information about the user's current position within the user interface or browser window. The user's current position within the user interface or browser window can be determined from the position of a cursor or from the current position of a scroll bar within the user interface. If the information panel is not currently displayable within the user interface (330), the operating system and/or browser can select the next information panel in the list if one exists (370), otherwise the process terminates.

However, if the information panel is currently displayable within the user interface (330), the operating system and/or browser can determine if any of the information elements within the information panel is currently displayable and/or should currently be displayed within the user interface (340). As before, the operating system and/or browser can use information about the current size of the user interface or browser window and information about the user's current position within the user interface or browser window to make this determination. For example, as discussed above, the operating system and/or browser can determine that an information element within an information panel is currently displayable and should be displayed whenever the information about the current size of the user interface or browser window and the user's current position within the user interface or browser window indicates that the user has selected (e.g., clicked on) the information panel, has scrolled past the title of the information panel, or that the information elements within the information panel have become displayable.

If the operating system and/or browser determines that no information elements are currently displayable in the user interface, the operating system and/or browser can display the title of the information panel in the user interface (350). By displaying only the title of the information panel, the panel will appear to be in its collapsed state within the user interface. However, if the operating system and/or browser determines that at least one information element within the information panel is currently displayable in the user interface (340), the operating system and/or browser can display the title of the information panel and the title of the at least one currently displayable information element within the information panel in the user interface (360). The title of the at least one currently displayable information element can be displayed beneath the title of the information panel in the user interface. By displaying both the title of the information panel and the title of the at least one information element within the information panel, the information panel will appear to be in its expanded state within the user interface. After displaying either the title of the information panel (350) or the title of the information panel and the titles of all currently displayable information elements within the information panel (360), the operating system and/or browser can select the next information panel in the list of information panels if one exists (370), otherwise the process terminates.

In some embodiments, the operating system and/or browser need not loop through the received information panels (320) in order to determine that a particular information panel, and/or an information element within that information panel, is currently displayable or should be displayed. For example, one or more actions by the user may indicate that a particular information panel and its information elements should be displayed if possible (e.g., if the user has expressed special interest in that particular information panel), which may then trigger determinations of whether the information panel and its information elements are currently displayable (330 and 340, respectively). These determinations may then, in turn, trigger display of the information panel title (350) and/or displayable information elements (360) for that particular information panel. In this way, one or more information panels may be directly displayed and/or expanded, without the need to loop through the other information panels.

Figure 4:
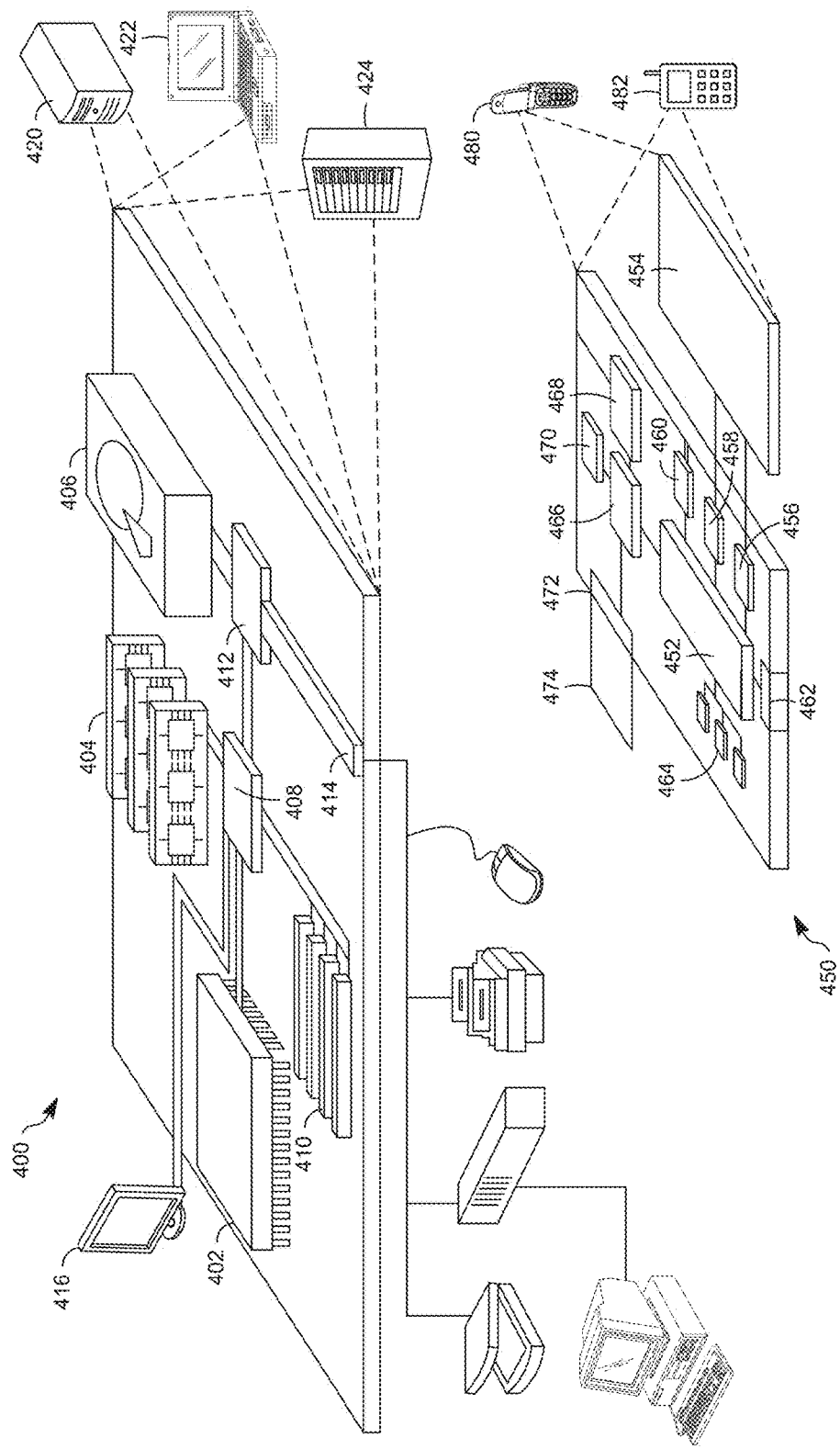
FIG. 4 is a schematic illustration of a computer device and a mobile computer device that can be used to implement the techniques described herein.

FIG. 4 is a schematic illustration of a generic computer device 400 and a generic mobile computer device 450 that may be used with the techniques described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

According to an example embodiment, one or more movable information panels may be provided. A movable information panel may be a set of displayable information that may be moved to different locations. An information panel may be associated with (or coupled to) and disassociated from (or decoupled from) web pages, and may be converted from an information panel to a tabbed web page (and vice versa). Also, an information panel may be docked to a panel bar and may be undocked from the panel bar, for example. Information panels may be elements, such as elements or portions of a web page, that may be selected by a user, e.g. via a mouse or pointing device, and moved to different locations. Information panels may include, as some examples, applications, web pages, a task list, a buddy list or contact list, a chat roster, an email application (e.g., Email web based email application), a video application window, a window for a text or Word document and other user generated content, a pop-up window, a weather information panel that provides weather information, etc. An information panel, at least in some cases, may be displayed as a small window or mini web page that is smaller than a full-size web page or window, as displayed.

For example, a browser may recognize and display a movable information panel(s) within a tabbed page, or may move (e.g., based upon user input) the information panel to a different page or application, and the user may associate (or couple or embed) the information panel to the new page or application. In another example, a user interested in a particular information panel in a tabbed page that is crowded with less useful information can select the information panel of interest, and dock it to the left of the browser (e.g., dock it to a vertical panel bar on the desktop), dock it to a horizontal panel bar on a desktop or dashboard at the bottom of a desktop interface, or elevate (or move) the information panel to its own tab (e.g., displaying the information panel as its own tabbed page) within the browser. These are merely some examples.

A movable information panel, e.g., in the case of a web page, may include an associated block of HTML (Hypertext Markup Language) code (or code provided in another language) with an attribute of "extractable" (or "movable"), for example, which may indicate to the web browser that this information panel and associated HTML code may be disassociated (or decoupled or extracted) from other web pages or windows, and moved to other locations, and may even be associated (or coupled) to a new web page, window or application, for example.

In an example embodiment, a movable information panel may be associated with (or coupled to or embedded within) a page or window where the information panel is provided at a fixed location. For example, when an information panel is associated with a web page, the information panel may cover up a portion of the web page where it resides, and the information panel may be provided at a static or fixed location such that the information panel may move with the associated web page. The information panel may be disassociated (or decoupled) from the page or window, e.g., when a user selects a "pop-out" (or disassociate) area or portion of the information panel, which may cause the information panel to pop-out or be disassociated (or extracted) from the page or window, allowing the information panel to move with respect to the page or window, fore example. In other example embodiments, an information panel may be disassociated (or decoupled) by a user selecting a "pop-out" menu option using a mouse, keyboard or other pointing device, or by simply selecting the information panel and dragging the information panel to a new location. Similarly, an information panel may be associated with (or coupled to) a web page by selecting a "pop-in" (or associate) area or button of the information panel, by selecting a "pop-in" menu option, or by simply dragging and dropping the information panel onto the web page or application to which the information panel is being associated with.

An information panel may exist as part of a web page (associated with the web page), or as a disassociated information panel. An information panel may also be docked to a panel bar, which may be located anywhere on a desktop, e.g., horizontal panel bar at an upper or lower edge, or a vertical panel bar. Also, information panels may be created or opened based on an address or link or URL (Uniform Resource Locator). For example, an information panel may be opened or created by typing in the address or link to the information panel in an application (such as a web browser), or by selecting or clicking on a link to the information panel. Once created or opened, the information panel may be moved to various locations, associated with a web page, docked to a panel bar, converted to a tabbed web page, etc.

Figure 5A:
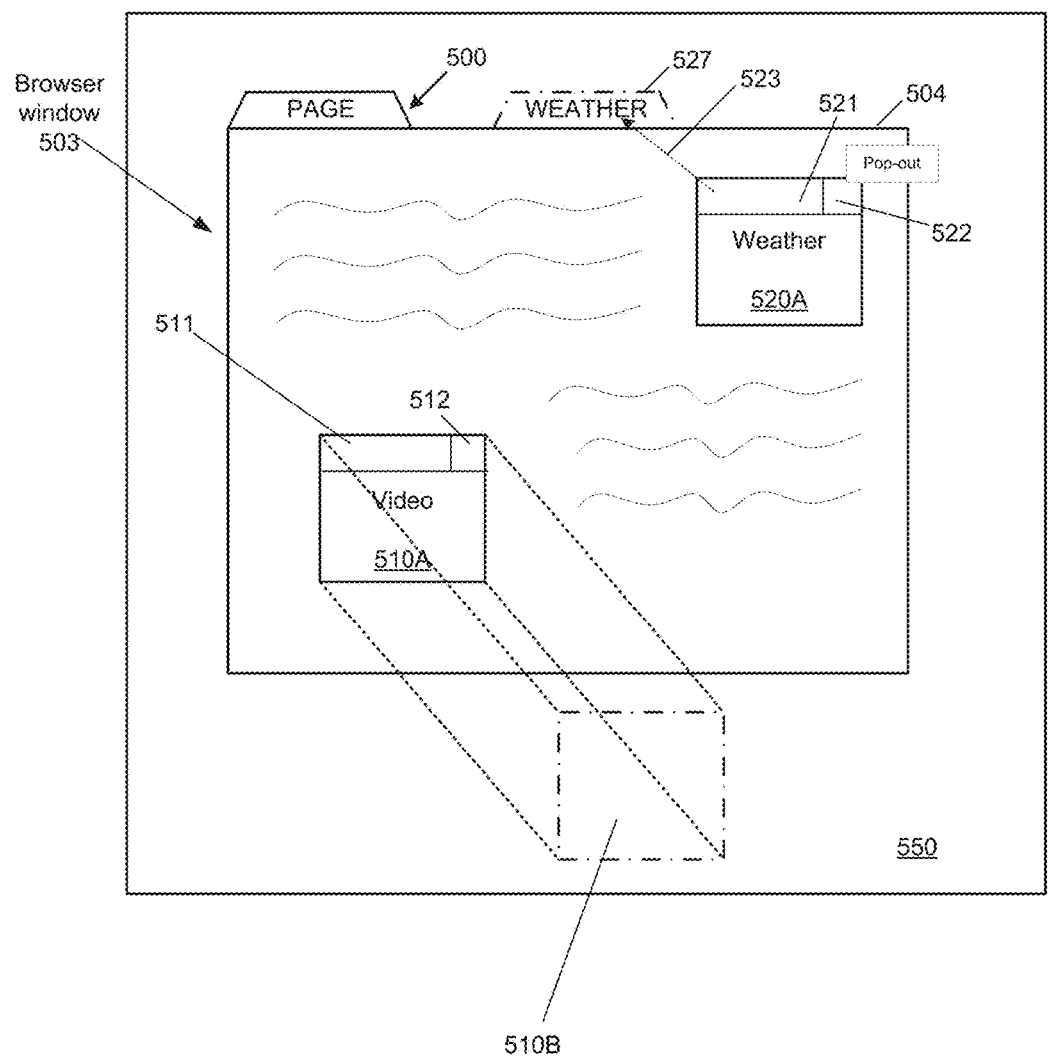
FIG. 5A is a block diagram illustrating movable information panels according to an example embodiment.

FIG. 5A is a block diagram illustrating movable information panels according to an example embodiment. A browser window 503 may be provided (or displayed) on (or within the boundary of) a computer desktop 550. The browser window 503 may include a tabbed web page 500. Other tabbed web pages may be provided, and one of the web pages may be displayed when the associated tab is selected, for example. An information panel 520A may be coupled to (or embedded within) the page 500. Information panel 520A may be, for example, a weather information panel 520A that may include a block of HTML code to display weather information for San Jose, Calif., for example. An information panel 510A may also be provided, and may be a video information panel to show or display a video.

Information panel 520A may include an area or region, such as a pop-out area 522 (or pop-out button) that may allow a user to pop-out or disassociate (or decouple) the information panel 520A from the web page 500, and allow the information panel to move with respect to web page 500. Information panel 520A may include a draggable area 521, where a user may select this draggable area 521 to drag or move the information panel 520A to a different location, e.g., via a drag-and-drop operation, for example once the information panel 520A has been popped-out or decoupled.

Similarly, information panel 510A may include a pop-out area 512 to allow a user to pop-out or disassociate the information panel from web page 500, and a draggable area 511 that may allow a user to select to move the information panel 510A via a drag-and-drop operation once the information panel 510A has been popped-out or decoupled. Information panels 510A and 520A may be smaller than the tabbed web page 500 or the browser window 503.

Alternatively, an information panel may be associated or disassociated from a web page or application based on a selection of a menu option for the information panel, e.g., an associate (or "pop-in") menu option, or a disassociate (or "pop-out") menu option. In another example embodiment, it may not be necessary to disassociate an information panel from a web page using a pop-out area or a pop-out menu command. Rather, the information panel may be disassociated from a web page when the information panel is selected and dragged using a pointing device, for example. In this example, therefore, a separate disassociate (or pop-out) operation is not necessary, as the information panel may simply be dragged and dropped to a new location. Similarly, in one example embodiment, an information panel may be associated with a web page or application by dragging and dropping the information panel onto the web page or application window.

In an example embodiment, when an information panel is associated with a web page, the web page or browser window, the information panel may be (or may be considered to be) a part of the browser window or web page, and the web page may control the information panel, e.g., adjust or control its size, location, appearance, and may control other qualities of the information panel. Once the information panel has been disassociated from a web page, communication may still occur between the (previously associated) web page and the information panel, but the web page may not typically control the information panel. For example, after disassociating a chat roster information panel from an email web page, communication may still occur between the chat roster and the email application (e.g., to perform updates on one based on changes to the other), but the chat roster characteristics may not typically be controlled by the email application.

In an example embodiment, a user may select pop-out area 512 to pop-out or disassociate (or decouple) the information panel 510A from web page 500. The user may then select the draggable area 511 to drag the information panel 510A (via a drag-and-drop operation) outside of the browser window 503 and web page 500 to a new location 510B on desktop 550. The information panel may be placed at a desired location on the desktop, and may then be associated with a different web page, may be docked to a panel bar or the desktop, or may be converted to a tabbed web page, as examples.

In another example embodiment, a user may select pop-out area 522 of information panel 520A to pop-out or disassociate the information panel 520A from web page 500. The user may then select the draggable area 521 and pull or drag the information element (as shown by line 523) up to a tab strip 504 of the browser 503 and tabbed web page 500 where one or more tabs are located, or will be located. This may cause the browser to automatically display the information panel 520A as a tabbed web page, e.g., at the same level as tabbed page 500. For example, dragging the information panel to the tab strip 504 and dropping the information panel over the tab strip 504 may cause the information panel 520A to be converted to a tabbed web page, e.g., where the size of the information panel 520A may be increased in size and a tab 527 for such web page may be added to the tab strip 504.

Alternatively, an information panel may be converted to a tabbed web page by clicking on an information panel or by selecting a "convert to tabbed web page" menu option for the information panel. As noted, converting an information panel to a tabbed web page may include, for example, increasing a size (or adjusting a size) of the information panel and adding a tab to the tab strip for the information panel.

Figure 5B:
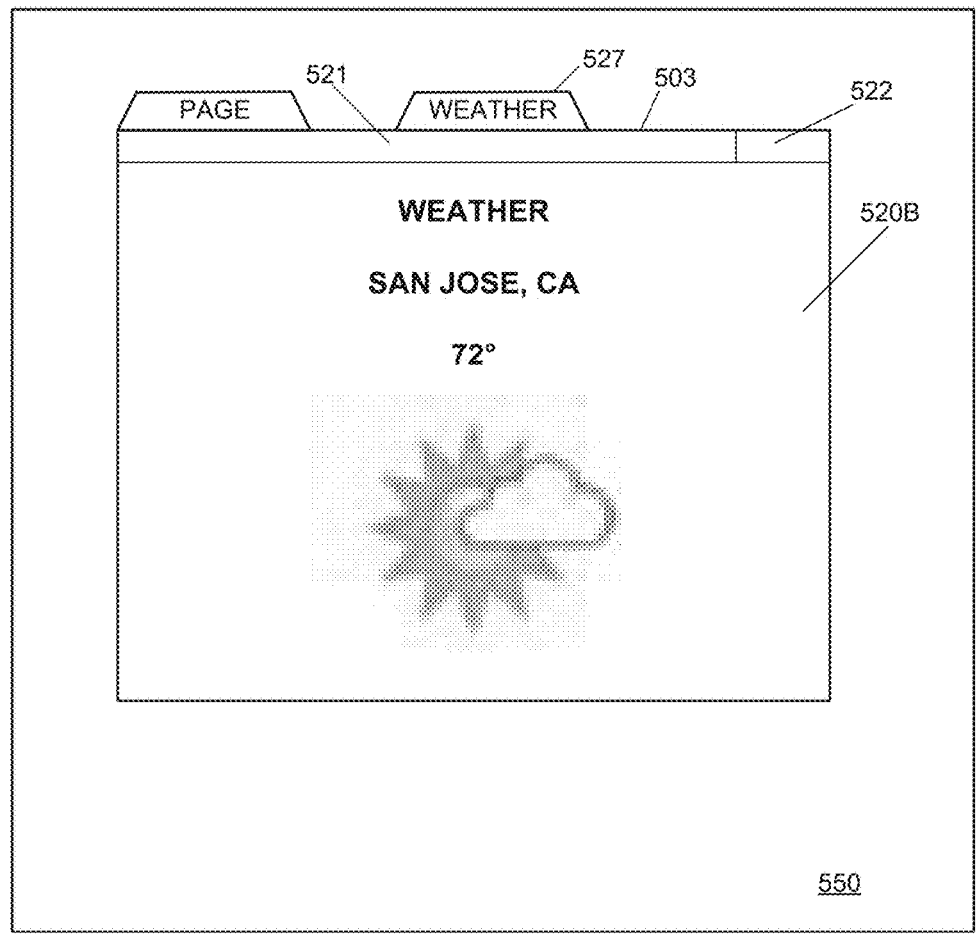
FIG. 5B is a diagram illustrating a display of information panel as a tabbed web page.

FIG. 5B is a diagram illustrating a display of information panel 520A as a tabbed web page 520B. Referring to FIGS. 5A and 5B, the information panel 520A may be pulled up to a tab strip 504 (FIG. 5A) of the browser or web page 500 where tabs are displayed. This may cause the information panel 520A to be increased in size to be displayed as a full-size web page 520B, and a tab 527 is displayed to identify this new tabbed web page 520B. In this manner, an information panel 520A may be elevated or moved to a tab strip 504 of a browser window 503 or web page 500 where other tabs are displayed, which may cause the browser to increase a size of the information panel 520A, and to display the information panel 520A as a tabbed web page 520B with a tab 527, as shown in FIG. 5B, for example.

In an example embodiment, the information panel 520B that is displayed as a tabbed web page (520B in FIG. 5B) may be moved back to a smaller movable web page 520A, e.g., by selecting the pop-out area 522 and/or by dragging the window down e.g., using the draggable area 521, for example, or by using another command or user input.

Figure 5C:
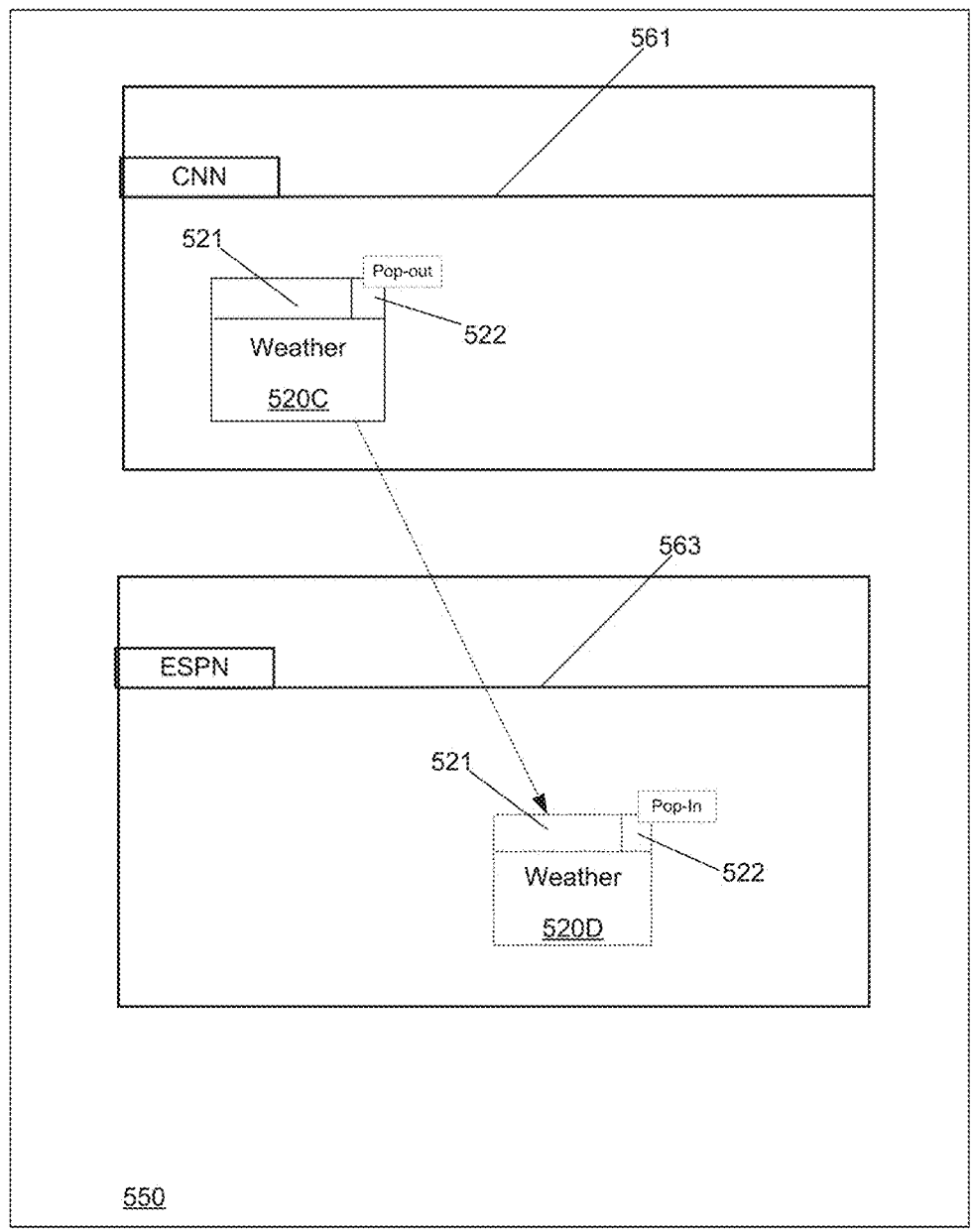
FIG. 5C is a diagram illustrating moving an information panel from a first application window to a second application window according to an example embodiment.

FIG. 5C is a diagram illustrating moving an information panel from a first application window to a second application window according to an example embodiment. In this example, two application windows are shown on a computer desktop 550. The application windows may be for different applications (e.g., web page for a first window, and a Word or text document for a second window), or may be two windows of a same type of application, e.g., two web pages. In this example, two application windows are shown as two web pages including a CNN web page 561 and an ESPN web page 563. An information panel 520C is coupled to (or embedded within) the CNN web page 561. A user may select the pop-out area 522 of information panel 520C to disassociate the information panel from the web page 561. The user may then drag or move the information panel 520C beyond or outside the CNN web page 561, across the desktop 550 to the ESPN web page 563. Information panel 520C, after being moved to ESPN web page 563 is shown as information panel 520D, where information panels 520C and 520D may be the same information panel, but at different locations as shown in FIG. 5C.

In this manner, the information panel 520 C may be displayed at a first location within a boundary of a first application window (e.g., within web page 561). The information panel 520C may be moved, e.g., via a drag-and-drop operation in accordance with user input (e.g., based on user motion/movement of a mouse or other pointing device), to a second location (shown as 520D) within a boundary of a second application window, e.g., within web page 563.

The user may then select the "pop-in" area 522 of the information panel 520D to pop-in (or associate) the information panel 520D to the ESPN web page 563 (e.g., where the information panel 520D will not move without popping it out again). Note the area 522 may, in an example embodiment, toggle the information panel between pop-out (disassociate or decouple) and pop-in (associate or couple).

Figure 6A:
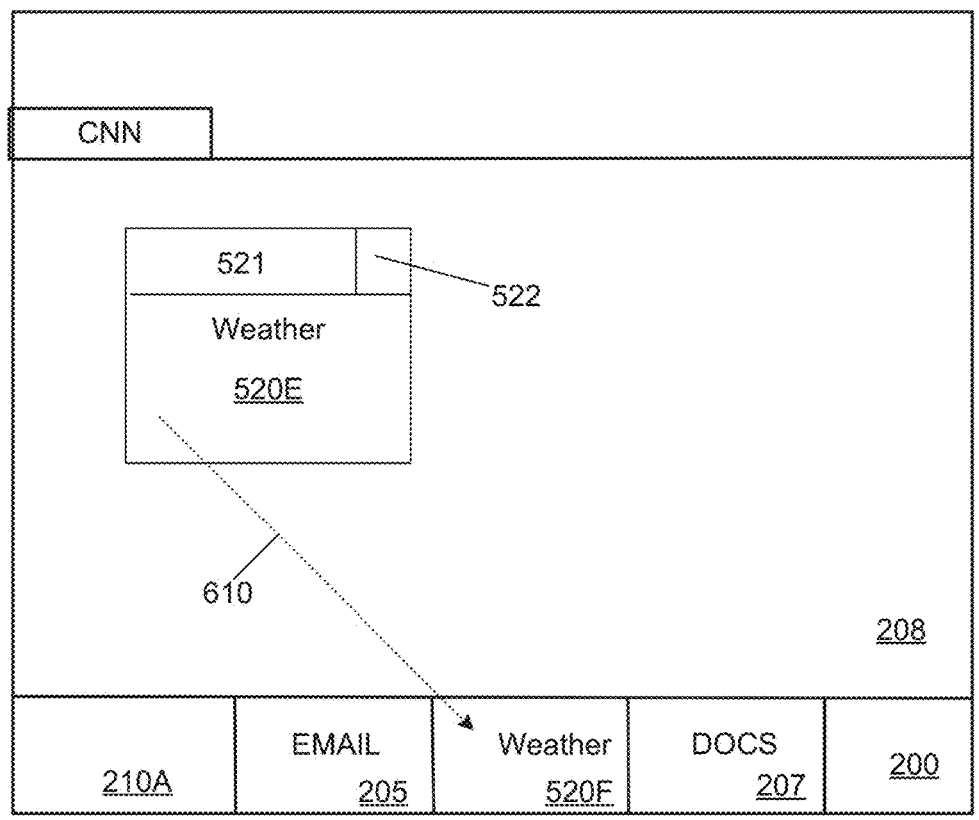
FIG. 6A is a diagram illustrating docking an information panel to a horizontal panel bar according to an example embodiment.

FIG. 6A is a diagram illustrating docking an information panel to a horizontal panel bar according to an example embodiment. In this example, an information panel 520E may be provided on or within a web page 208. A horizontal panel bar 210A is provided on a user interface, which may be provided on a desktop. The horizontal panel bar 210A may include a plurality of information panels docked (or attached) thereto (or included therein), including an EMAIL information panel 205, a DOCs information panel 207, etc. The weather information panel 520E is provided within the tabbed web page 208, and may be associated to the web page 208. When associated with the web page 208, information panel 520E may be a part of the web page 208, and may be provided at a fixed or static location on the web page, where the information panel moves when the web page moves. A user may disassociate (or decouple) the weather information panel 520E from the web page 208 (e.g., by selecting the pop-out area 522, by using a pop-out menu command, or by simply selecting and dragging the information panel), and then move (e.g., via drag-and-drop operation shown by line 610) the information panel 520E outside of web page 208 to horizontal panel bar 210A. In an example embodiment, when the information panel reaches the panel bar 210A (e.g., makes contact with, or comes within a threshold distance of the panel bar 210A) the information panel 520E is automatically (e.g., without user selecting pop-in area 522) docked to the panel bar 210A as information panel 520F. The docked weather information panel is shown as weather information panel 520F included within panel bar 210A. In an example embodiment, docking may include attaching the information panel to other panels within the panel bar 210A, or including the information panel within the panel bar 210A. Alternatively, after the information panel 520E reaches panel bar 210A, a user may select pop-in area 522 (or other command) to dock (or attach) the information panel 520E to the panel bar 210A (docked panel shown as weather information panel 520F).

The docking may include the processor or browser reducing a size of the docked information panel to allow the panel bar 210A to accommodate a plurality of information panels, and then attaching the reduced information panel to the panel bar. For example, as more information panels are docked or attached to the panel bar 210A (e.g., more docked panels squeezed into a same size panel bar), the size (e.g., width) of each information panel docked to the horizontal panel bar 210A may be decreased. Thus, the size of the information panel 520E may be decreased or reduced for docking the panel to the panel bar. For example, information panel 520F that is docked to the panel bar 210A may be smaller than the information panel 520E that is not docked to the panel bar.

Figure 6B:
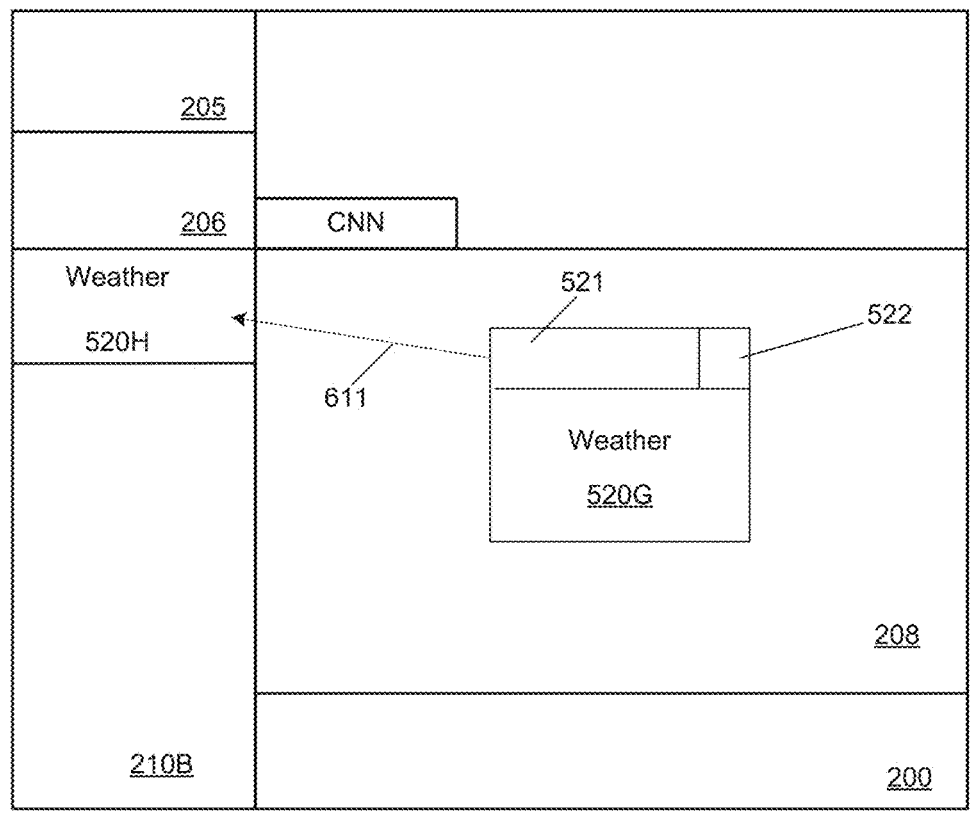
FIG. 6B is a diagram illustrating docking an information panel to a vertical panel bar according to an example embodiment.

FIG. 6B is a diagram illustrating docking an information panel to a vertical panel bar according to an example embodiment. A user interface may include a tabbed web page 208 and a vertical panel bar 210B. Vertical panel bar 210B may include a number of information panels docked or attached thereto, including information panels 205 and 206. An information panel 520G (e.g., weather information panel 520G) may be associated with (or coupled or attached to) and provided on (within the boundary of) the web page 208. A user may pop-out or disassociate the information panel 520G from the web page 208, e.g., by selecting a pop-out area 522, by using a pop-out menu option, or by dragging the information panel. The computer or browser, in accordance with or based upon user input via mouse or other pointing device, may cause the browser or computer to move (as shown by line 611) the weather information panel 520G, e.g., via a drag-and drop operation to panel bar 210B. The weather information panel 520G may be docked (or attached) to the vertical panel bar 210B (shown as panel 520H in the panel bar 210B), either automatically when the panel reaches the panel bar 210B, or when a user also selects a pop-in area 522, for example.

In addition, a user may then disassociate the weather information panel 520H from the panel bar 210B, which allows the information panel 520H to move with respect to the panel bar 210B. The user may then select draggable area 521 to cause the browser or computer (processor) to un-dock (or detach or decouple) the panel 520H from the panel bar 210B. The information panel may then be moved to another location on the desktop.

Figure 7:
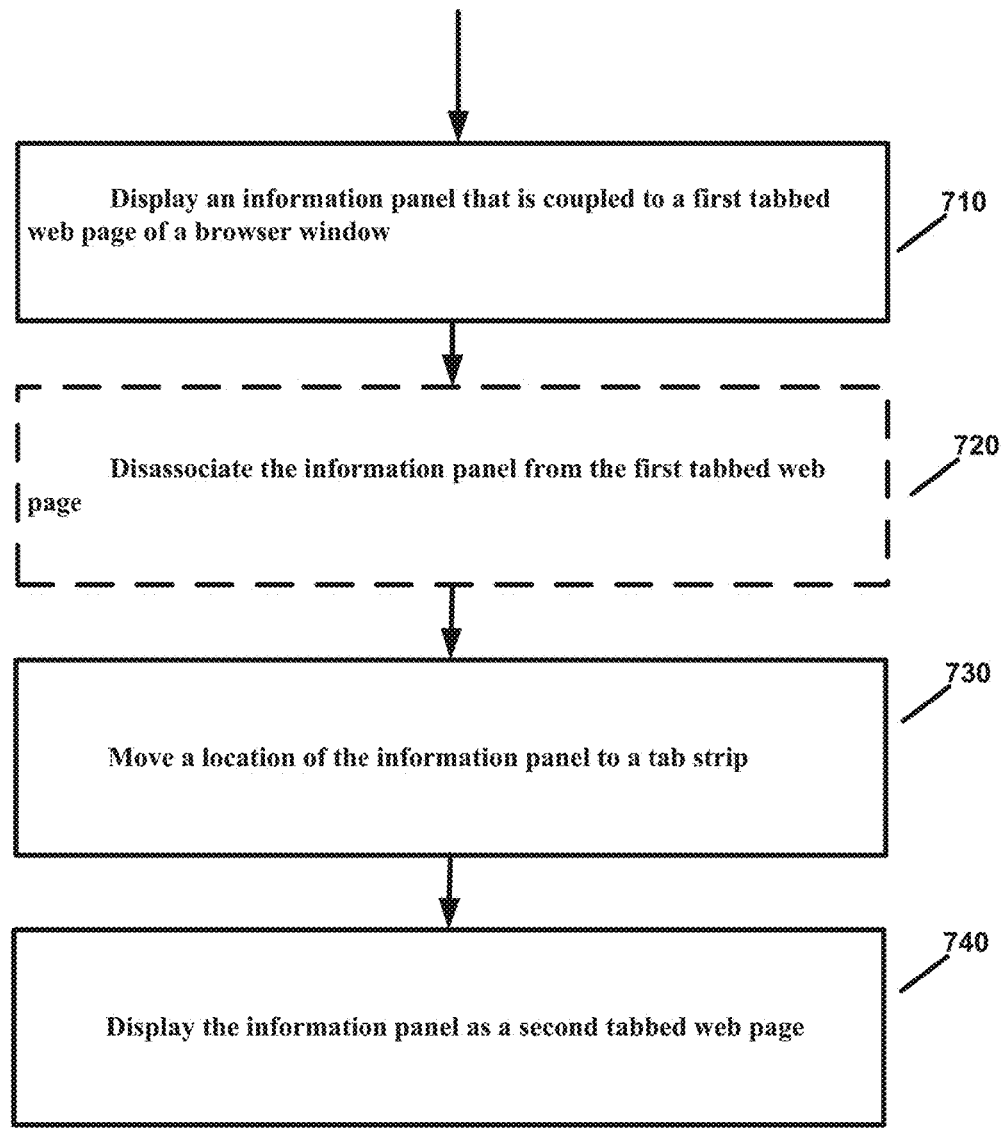
FIG. 7 is a flow chart illustrating moving an information panel according to an example embodiment.

FIG. 7 is a flow chart illustrating moving an information panel according to an example embodiment. Referring to FIG. 7, an information panel may be displayed that is coupled to a first tabbed web page of a browser window (710). The information panel may be disassociated from the first tabbed web page (720) to allow the information panel to move with respect to the first tabbed web page. The information panel may be disassociated by selecting a disassociate area of the information panel, by selecting a disassociate menu command, or by dragging the information panel, for example.

The information panel may be moved to a tab strip, such as tab strip 504 (730). The information panel may be displayed as a second tabbed web page (740). For example, the information panel may be converted to a tabbed web page, which may include increasing or adjusting a size of the information panel and adding a tab for the new web page.

Figure 8:
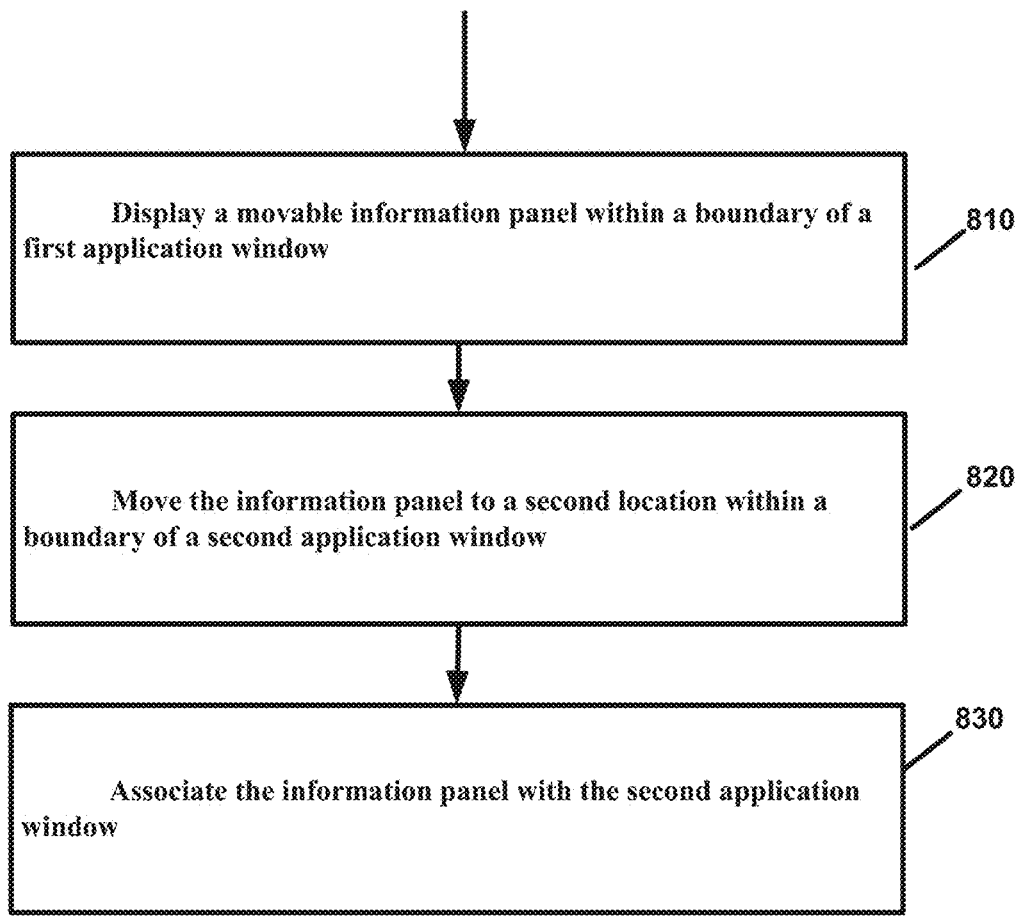
FIG. 8 is a flow chart illustrating moving an information panel according to another example embodiment.

FIG. 8 is a flow chart illustrating moving an information panel according to another example embodiment. A movable information panel may be displayed within a boundary of a first application window (810). The information panel may be moved to a location within a second application window (820). The information panel may be associated with the second application window (e.g., web page or other application window) (830). The information panel may be associated by selecting a pop-in or associate button or area, by using a menu command or option, or by dragging and dropping the panel onto the new application window to be associated.

Figure 9:
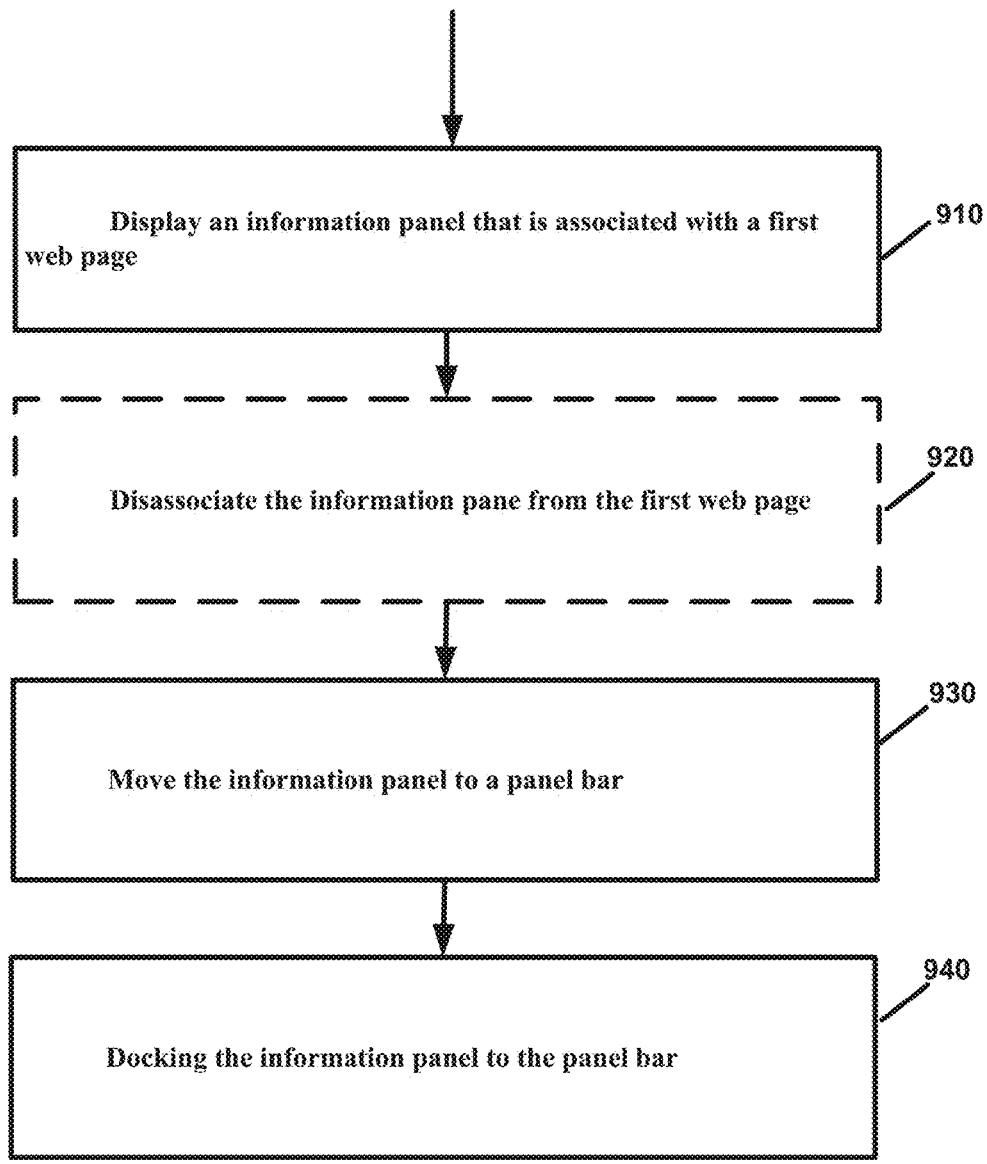
FIG. 9 is a flow chart illustrating moving an information panel according to another example embodiment.

FIG. 9 is a flow chart illustrating moving an information panel according to another example embodiment. An information panel associated with a first web page may be displayed (910). Although not required, the information panel may be disassociated from the first web page (920), e.g., by using a pop-out (or disassociate) area, a pop-out menu command or by dragging the information panel. The information panel may be moved to a panel bar (930). The panel bar may then be docked to the panel bar (940). The docking may include, for example, dragging and dropping the information panel onto the panel bar, which may cause the information panel to be added to the panel bar.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described above. Nevertheless, it will be understood that various modifications may be made without departing from the spirit and scope of the invention. For example, the logic flows depicted in the figures do not necessarily require the particular order shown, or sequential order, to achieve desirable results. In addition, other steps may be provided or eliminated from the described flows, and other components may be added to or removed from the described systems, without departing from the scope of the invention. Accordingly, other implementations are within the scope of the following claims.

What is claimed is:

1. A computer implemented method comprising:
   displaying, through operation of a processor, a movable information panel that is docked at a first location within a boundary of a first application window, the movable information panel including a graphical-user-interface (GUI) configured to display a plurality of elements including at least a first element a second element and a third element:
     the first element is configured to dock and undock the movable information panel within a first application window, wherein
     the first element is configured to toggle between a pop-out state and a pop-in state,
     the pop-out state indicates the movable information panel is undocked and movable, and
     the pop-in state indicates the movable information panel is docked unmovable,
     the second element configured to enable dragging of the movable information panel, and
     the third element including a plurality of information elements, wherein the third element is configured to expand to show the plurality of information elements and to contract to hide the plurality of information elements;
   in response to causing the first element to be in the pop-out state, undocking the information panel from the first application window;
   after undocking the information panel from the first application window, initiating, through operation of the processor, a drag-and-drop operation that causes the processor, in response to the drag-and-drop operation, to:
     disassociate the information panel from the first application window;
     move a location of the information panel to a second location within a boundary of a second application window based on selecting the second element and moving a position of the movable information panel; and
     after moving the location of the information panel,
     docking the information panel by causing the first element to be in the pop-in state, and
   associating the information panel to the second application window.

2. The method of claim 1, further comprising displaying the information panel within the second application window.

3. The method of claim 1, wherein disassociating the information panel from the first application window allows the information panel to move with respect to the first application window.

4. The method of claim 1, further comprising:
   disassociating, by the processor, the information panel from the second application window to allow the information panel to move with respect to the second application window.

5. The method of claim 1, wherein the first application window includes a window of a first type of application and the second application window includes a window of a second type of application.

6. The method of claim 1, wherein the first application window includes a first web page, and wherein the second application window includes a second web page.

7. The method of claim 1, wherein the associating the information panel to the second application window comprises:
   receiving a user selection of the first element on the information panel to pop-in or associate the information panel to the second application window.

8. The method of claim 1, wherein disassociating the information panel from the first application window allows the information panel to move with respect to the first application window.

9. A non-transitory computer-readable storage medium having stored thereon computer executable program code which, when executed on a computer system including a processor, causes the computer system to perform steps comprising:

displaying, through operation of the processor, a movable information panel that is docked at a first location within a boundary of a first application window, the movable information panel including a graphical-user-interface (GUI) configured to display a plurality of elements including at least a first element a second element and a third element:

the first element configured to dock and undock the movable information panel within a first application window, wherein the first element is configured to toggle between a pop-out state and a pop-in state, the pop-out state indicates the movable information panel is undocked and movable, and the pop-in state indicates the movable information panel is docked unmovable, the second element configured to enable dragging of the movable information panel, and the third element including a plurality of information elements, wherein the third element is configured to expand to show the plurality of information elements and to contract to hide the plurality of information elements;

in response to causing the first element to be in the pop-out state, undocking the information panel from the first application window;

after undocking the information panel from the first application window, initiating, through operation of the processor, a drag-and-drop operation that causes the processor, in response to the drag-and-drop operation, to:

disassociate the information panel from the first application window;

move a location of the information panel to a second location within a boundary of a second application window based on selecting the second element and moving a position of the movable information panel; and after moving the location of the information panel, docking the information panel by causing the first element to be in the pop-in state, and associating the information panel to the second application window.

10. The non-transitory computer-readable storage medium of claim 9, wherein the associating the information panel to the second application window comprises:

receiving a user selection of the first element on the information panel to pop-in or associate the information panel to the second application window.

11. The non-transitory computer-readable storage medium of claim 9, wherein the steps further comprise displaying the information panel within the second application window.

12. The non-transitory computer-readable storage medium of claim 9, wherein the steps further comprise disassociating the information panel from the second application window to allow the information panel to move with respect to the second application window.

13. The non-transitory computer-readable storage medium of claim 9, wherein the first application window includes a window of a first type of application and the second application window includes a window of a second type of application.

14. The non-transitory computer-readable storage medium of claim 9, wherein the first application window includes a first web page, and wherein the second application window includes a second web page.

* * * * *